United States Patent [19]

Yoshino et al.

[11] Patent Number: 4,634,952
[45] Date of Patent: Jan. 6, 1987

[54] INVERTER

[75] Inventors: Hozo Yoshino; Mitsuo Koshi; Osamu Sumiyoshi, all of Tokyo, Japan

[73] Assignee: System Homes Company, Ltd., Tokyo, Japan

[21] Appl. No.: 556,321

[22] Filed: Nov. 30, 1983

[51] Int. Cl.[4] ............................................. H02P 5/40
[52] U.S. Cl. .................................... 318/811; 318/803
[58] Field of Search ................. 318/811, 803, 807–810

[56] References Cited

U.S. PATENT DOCUMENTS

| | | | |
|---|---|---|---|
| 3,662,247 | 5/1972 | Schieman | 318/808 |
| 3,986,087 | 10/1976 | Zankl et al. | 318/803 |
| 4,189,669 | 2/1980 | Van Loon et al. | 318/811 |
| 4,290,001 | 9/1981 | Espelage | 318/811 |
| 4,337,429 | 6/1982 | Stuart | 318/811 |
| 4,348,734 | 9/1982 | Dougherty | 363/41 |
| 4,409,534 | 10/1983 | Bose | 318/811 |
| 4,488,103 | 12/1984 | Morinaga et al. | 318/811 |

Primary Examiner—David Smith, Jr.
Attorney, Agent, or Firm—Oblon, Fisher, Spivak, McClelland, & Maier

[57] ABSTRACT

A software-based inverter has a logic portion which is preferably made of LSIs. The inverter is therefore low-cost, yet provides a more efficient, precise and sophisticated operation for the inverter-motor combination. The inverter permits independent frequency and voltage application within the maximum and minimum voltage/frequency envelopes for a substantially optimal inverter-motor performance under a given load condition. The higher harmonics associated with the signal modulation are limited to a range between 0.9 kHz to 1.5 kHz with the center frequency at 1.2 kHz so that the harmonics are substantially attenuated by motor windings compared to the signal having a frequency range of 10 Hz–120 Hz, thereby resulting in higher efficiency and lower noise and vibration levels for the inverter-motor combination.

10 Claims, 18 Drawing Figures

FIG.5

CARRIER FREQUENCY RANGE

| FREQUENCY GROUP | ① FREQUENCY RANGE, Hz | ② NO. OF SAMPLINGS PER CYCLE | ③ = ① × ② ÷ 1000 CARRIER FREQUENCY RANGE, KHz |
|---|---|---|---|
| A | 9 — 14 | 108 (36 × 3) | .97 — 1.51 |
| B | 15 — 23 | 63 (21 × 3) | .95 — 1.45 |
| C | 24 — 39 | 39 (13 × 3) | .94 — 1.52 |
| D | 40 — 59 | 24 (8 × 3) | .96 — 1.42 |
| E | 60 — 89 | 15 (5 × 3) | .90 — 1.34 |
| F | 90 — 125 | 12 (4 × 3) | 1.08 — 1.50 |

| FREQUENCY GROUP SEGMENTATION | | ROM ADDRESS INCREMENT | BASELINE SINE WAVE MEMORY | | 1φ SINE WAVE GENERATOR | |
|---|---|---|---|---|---|---|
| FREQUENCY RANGE, Hz | FREQ. GROUP | NO. OF SAMPLINGS PER CYCLE | SAMPLING VALUE OF SINE WAVE WITH UNITY MAGNITUDE | | SAMPLING VALUE OF SINE WAVE WITH A MAGNITUDE OF v | QUANTIZING | CODING |
| 9 – 14 | A | 108 | $\{A_1, A_2, \cdots, A_{108}\}$ | | | |
| 15 – 23 | B | 63 | $\{B_1, B_2, \cdots, B_{63}\}$ | | | |
| 24 – 39 | C | 39 | $\{C_1, C_2, \cdots, C_{39}\}$ | | | |
| 40 – 59 | D | 24 | $\{D_1, D_2, \cdots, D_{24}\}$ | | | |
| 60 – 89 | E | 15 | $\{E_1, E_2, \cdots, E_{15}\}$ | | | |
| 90 –125 | F | 12 | $\{F_1, F_2, \cdots, F_{12}\}$ | | | |

1φ SINE WAVE GENERATOR

DESIRED FREQUENCY (ex. f=10Hz)

$\{A_1, A_2, \cdots, A_{108}\} \times \sqrt{2} \times v = \{X_1, X_2, \cdots, X_{108}\}$ DESIRED VOLTAGE v $\{Y\} = \{Y_1, Y_2, \cdots, Y_{108}\}$ $Y_1 = \left[128 - \dfrac{128x_1}{230\sqrt{2}}\right]$ $Y_2 = \left[128 - \dfrac{128x_2}{230\sqrt{2}}\right]$ $Y_3 =$

SELECTABLE FREQUENCIES, Hz*

── TOTAL 56 FREQUENCIES ── using 6MHz crystal

| FREQUENCY GROUP | FREQUENCY RANGE, Hz | Number of CLOCK PULSES<br>NUMBER OF SAMPLINGS × NUMBER OF QUANTIZING | CLOCK PULSE PERIOD |||||||||||
|---|---|---|---|---|---|---|---|---|---|---|---|---|
| | | | CLOCK PULSE GROUP |||||||||||
| | | | a<br>1/6 μsec<br>× 26 | b<br>× 25 | c<br>× 24 | d<br>× 23 | e<br>× 22 | f<br>× 21 | g<br>× 20 | h<br>× 19 | i<br>× 18 | j<br>× 17 | k<br>× 16 |
| A | 9 – 14 | 108 × 256 | | 8.68 | 9.04 | 9.44 | 9.86 | 10.33 | 10.85 | 11.42 | 12.06 | 12.77 | 13.56 |
| B | 15 – 23 | 63 × 256 | 14.31 | 14.88 | 15.50 | 16.17 | 16.91 | 17.72 | 18.60 | 19.58 | 20.67 | 21.88 | 23.25 |
| C | 24 – 39 | 39 × 256 | | 24.04 | 25.04 | 26.13 | 27.32 | 28.62 | 30.05 | 31.63 | 33.69 | 35.35 | 37.56 |
| D | 40 – 59 | 24 × 256 | | 39.06 | 40.69 | 42.46 | 44.36 | 46.50 | 48.83 | 51.40 | 54.25 | 57.44 | |
| E | 60 – 89 | 15 × 256 | 60.10 | 62.50 | 65.10 | 67.93 | 71.02 | 74.40 | 78.13 | 82.24 | 86.81 | | |
| F | 90 – 125 | 12 × 256 | | | | | 88.73 | 93.01 | 97.66 | 102.80 | 108.51 | 114.89 | 122.07 |

Selectable Frequency = [(Clock Pulse Period (sec) × Number of Clock Pulses per Cycle (/cycle)]$^{-1}$

INVERTER

BACKGROUND OF THE INVENTION

1. FIELD OF THE INVENTION

The present invention relates to an inverter, and more particularly to an inverter for use with induction motors of which logic is composed solely of software embedded in a microprocessor.

2. DESCRIPTION OF THE PRIOR ART

Prior art inverter logics such as those disclosed in U.S. Pat. No. 4,259,845, entitled, "Logic Control System for Inverter Driven Motor," granted to Norbeck are composed of analog hardware including a voltage controlled oscillator (VCO), comparators and analog-to-digital (A/D) converters and the like. Those inverters typically use thyristors for switching the line voltage power source and inverter output power. Hence, the functional capability is limited by the hardware arrangement of which structure is generally complex and thus expensive. Prior art inverter's voltage/frequency (v/f) characteristics are given a priori or are at most selectable manually. They are usually preprogrammed by hardwires to give either a constant torque, a constant power, or a combination thereof. Therefore, an optimum primary voltage cannot be selected as a function of instantaneous torque load demand, resulting in inefficient operation of an induction motor coupled to the inverter. To overcome this inefficiency problem, there is a teaching in U.S. Pat. No. 4,217,763 entitled, "Asynchronous Motor-Driven Machine having Variable Torque Demand such as Household Refrigerator Compressors," granted to Hammele et al. that the asynchronous motor is driven by a phase-angle control device at an optimal operating voltage matched to required torque to yield substantially optimal efficiency. However, within the scope of this patent, the teaching is limited only to substantially constant speed motors. Recently, there appeared some inverters which are composed of a digital logic stage and a transistor power stage. They are generally characterized by pulse width modulation (PWM) of a sine wave since such a modulation is possible by the transistor power stage with a faster switching rate compared to thyristors.

When PWM is employed to simulate sine functions of a continuous wave, the carrier frequency generally varies as a function of the desired inverter output frequency. This results in lower carrier frequencies at lower inverter output frequencies which leads to degraded efficiencies and increased noise and vibration levels of the motor.

The bit patterns associated with PWM are generally stored in a read-only-memory (ROM), because the clock period is too short to calculate a sine function on a realtime basis. As a consequence, a relatively large-scale ROM is need to memorize bit patterns for all possible sets of frequency/primary voltage. Moreover, as 0 and 1 are typically memorized in ROM's cells as is, a relatively large number of bits are necessary.

Inverters switch their frequency/primary voltage on a realtime basis. They therefore tend to lose the synchronization between the U-, V- and W-phases due to the time delay in switching, which sometimes leads to a motor stall.

SUMMARY OF THE INVENTION

A primary object of the present invention is to realize an inverter whose logic part is mostly composed of software embedded in a microprocessor and processed on a semi-real time basis, which provides a simple and low-cost inverter with a wider operating capability.

Another object of the present invention is to provide an inverter with such a characteristic as an arbitrary selection of primary voltage within the maximum v-f envelope for that motor when a desired frequency is given.

A still another object of the present invention is to provide an inverter whose carrier frequencies are always centered around 1.2 kHz when a sine wave is simulated by PWM, which results in higher efficiencies and lower noise and vibration levels.

A yet another object of the present invention is to calculate and prepare the bit pattern necessary for the next step frequency/primary voltage application on a semi-real time basis. This results in an elimination of ROM area which is otherwise necessary to memorize bit patterns for all possible frequency/primary voltage combinations.

A still further object of the present invention is to memorize a sampled value of a sine wave by an 8-bit quantization PWM coding and decode the PWMed sine wave therefrom, so that the size of memory is further reduced compared to the case when directly memorizing 1, 0 bit patterns in the memory.

The above mentioned objects are achieved by a software-based inverter of which microcomputer logic portion consists of dual microprocessors, a ROM, a crystal controlled oscillator, dual set random-access-memories (RAMs), three-phase RAMs, three-phase preset counters and latches, dual preset counters, three address pointers, an 8-bit counter, a calculation counter, a delay circuit, voltage inverters, low pass filters and gate shutoffs. The power generator portion consists of an AC/DC converter, base drivers, power amplifiers and motor windings.

In order to have a 1.2 kHz-centered carrier frequency, six frequency groups are formed between 9 Hz and 125 Hz. Each group has a different number of sampling for a sine wave with unit magnitude. The sampled values for six frequency groups are memorized as baseline sine waves. With desired frequency and voltage input, sampled values of a one-phase sine wave with the desired magnitude are then calculated and quantized. The coded bit pattern representing this wave form is successively stored in a writing portion of the dual set RAMs. A reading portion of the dual set RAMs delivers already memorized sine wave pattern to each memory of the writing portions of the three-phase RAMs, thus generating a three-phase sine wave. The reading portions of the three-phase RAMs issue their contents to the three-phase preset counters and latches, the outputs of which are applied to voltage inverters, low pass filters and gate shutoffs, completing a six-phase decoding. The outputs of the gate shutoffs are then applied to current and power amplifiers for switching the DC power source supplied from an AC/DC converter which is then applied to the motor windings.

BRIEF DESCRIPTION OF THE DRAWINGS

FIG. 5 is a table diagram showing carrier frequency range;

FIG. 7 is a table diagram showing how the one-phase sine wave generator shown in FIG. 2 functions to generate coded sine wave sequentially from the baseline sine wave memory;

FIG. 16 is a table diagram tabulating selectable frequencies;

DETAILED DESCRIPTION OF THE PREFERRED EMBODIMENT

Figure 1:
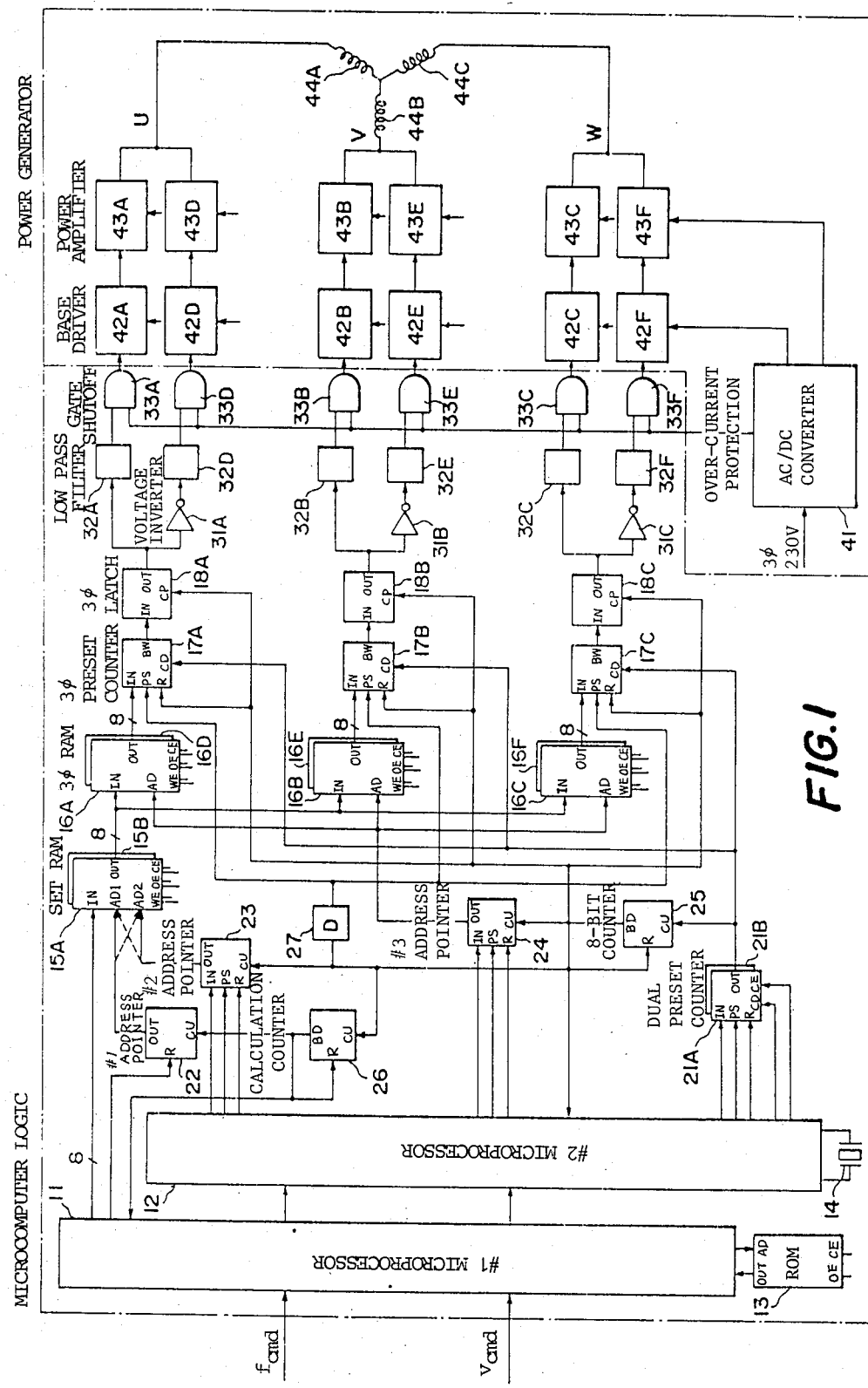
FIG. 1 is a block diagram showing an embodiment of an inverter according to the present invention.

An embodiment of the present invention is explained by referring to FIG. 1. As shown, the present invention consists of a microcomputer logic portion and a power generator portion. The microcomputer logic portion is described first. No. 1 microcomputer is provided to calculate and prepare a sampled, quantized and coded sine function for the next inverter input using baseline sine functions stored in a ROM 13. The ROM 13 also stores the maximum and minimum applicable frequency and voltage to motor windings 44A through 44C for a given frequency. No. 2 microprocessor 12 is primarily used for a timing signal generation, the clock signal of which is derived from a crystal controlled oscillator 14. The sampled, quantized and coded sine function is successively stored in the writing portion of the set RAM 15A and 15B, while the contents of the reading portion of the RAM 15A and 15B are transferred to the writing portions of the three-phase RAMs 16A through 16F. The reading portions of the three-phase RAMs 16A through 16F are dictated to transfer their contents to the three-phase preset counters 17A through 17C and to the three-phase latches 18A through 18C, by which the three-phase decoding of the stored information in the RAMs 16A through 16F is accomplished to obtain pulse width modulated (PWM) sine waves.

A dual preset counter 21A or 21B issues an appropriately timed clock pulse to the three-phase preset counters 17A through 17C for the three-phase decoding. An 8-bit counter 25 is connected to either one of the outputs of the dual preset counter 21A or 21B to count down the clock pulse to obtain the addressing increment and the reset signals of the latches 18A through 18C each every 256 clock pulses from the dual preset counter 21A or 21B. No. 1 address pointer 22 obtains its clock pulse from a calculation counter 26 to successively store the sampled, quantized and coded sine function into the writing portion of the set RAM 15A and 15B. No. 2 address pointer 23 is used to edit and generate the three-phase sine functions within the three-phase RAMs 16A through 16F from the one-phase sine wave which has been stored in the reading portion of the set RAM 15A and 15B. No. 3 address pointer increments the addresses of both the writing and reading portions of the three-phase RAMs 16A through 16F A delay circuit 27 is provided to obtain preset signals for the three-phase preset counters 17A through 17C.

The voltage inverters 31A through 31C invert the polarities of the output signals of the latches 18A through 18C thus generating both-side swinging six-phase signals from the decoded, one-side swinging three-phase signals. Low pass filters 32A through 32F are provided to delay the build-up time of positive-going pulses compensating for the cutoff delay associated with the negative-going pulses thus avoiding the firing of both of the tandemly connected power transistors causing a short circuit. Gate shutoffs 33A through 33F inhibit the PWM signals from applying to the power generator portion when over-current or power source shutdown is detected.

Now, the power generator portion is described. An AC/DC converter 41 transforms the alternating current (AC) line voltage power source into the direct current (DC) power source. Base drivers 42A through 42C supply enough current sources to power amplifiers 43A through 43F in response to the PWM signals obtained from the gate shutoffs 33A through 33F. The power amplifiers 43A through 43F generate power by further amplifying the current level supplied from the base drivers 42A thorugh 42F. Into motor windings 44A through 44C the currents flow from the power amplifiers 43A through 43F in a coordinated fashion to generate three-phase sine waves causing the motor to rotate.

As the microprocessors 11 and 12, Mitsubishi Electric Corporation's M5M80C49 are used. This microprocessor is of 8-bit type and made of complementary metal oxide semiconductor (CMOS) with the masked ROM. As its power source is −15 volts, it has a higher noise tolerance compared to TTL type microprocessors.

Figure 2:
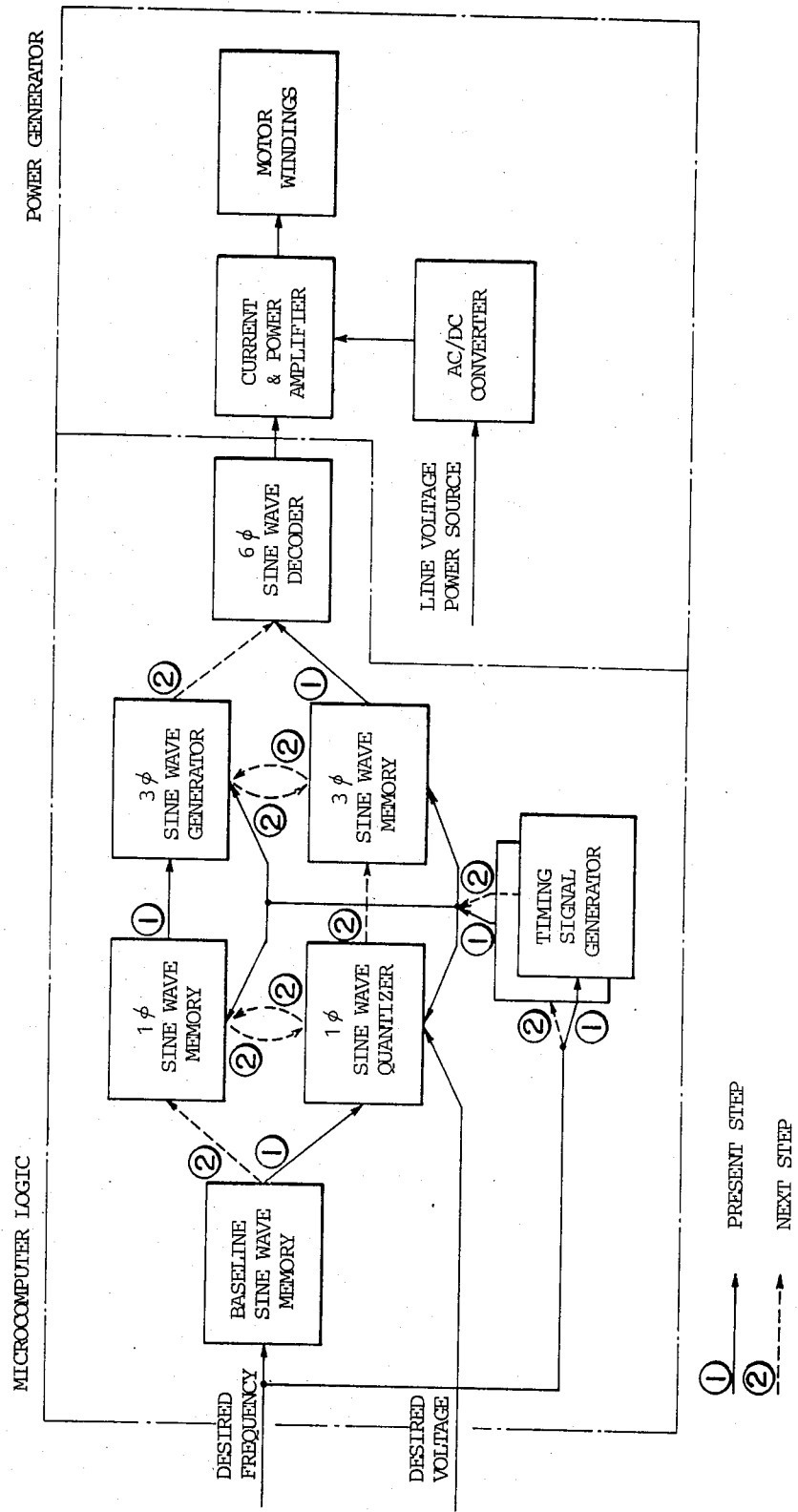
FIG. 2 is an explanatory diagram showing a functional relationship of the logics shown in FIG. 1.

A functional relationship of the logics shown in FIG. 1 is described next by referring to FIG. 2. In the baseline sine wave memory or in ROM 13, six sets of differently sampled sine waves with unity magnitude are stored, each representing six different frequency groups and thus six different sampling patterns. With the desired frequency given, one set of sampled sine wave is selected out of six. It will then be multiplied by the desired voltage level, quantized and coded into 8-bit binary data. This is primarily performed by the No. 1 microprocessor 11. The coded data therefore have 256 quantizing levels. The coded sine wave data with the desired magnitude are successively stored in the one-phase sine wave quantizer in FIG. 2 which corresponds to the writing portion of the set RAM 15A or 15B in FIG. 1. One-phase sine wave memory in FIG. 2 corresponds to the reading portion of the set RAM 15A or 15B and it edits the contents and transfers them to the three-phase sine wave generator in FIG. 2 which is the writing portions of the three-phase RAMs 16A through 16F. The three-phase sine wave memory indicated in FIG. 2 represents the reading portions of the three-phase RAMs 16A through 16F and delivers their contents to the six-phase sine wave decoder shown in FIG. 2. The six-phase sine wave decoder comprises the three-phase preset counters 17A through 17C, three-phase latches 18A through 18C, voltage inverters 31A through 31C, low pass filters 32A through 32F and gate shutoffs 33A through 33F illustrated in FIG. 1. Timing signals are generated and distributed from the timing signal generator in FIG. 2. It corresponds to the components shown in FIG. 1 including the crystal controlled oscillator 14, No. 2 microprocessor 12, the dual preset counters 21A and 21B, the 8-bit counter 25, the calculation counter 26, No. 1, No. 2 and No. 3 address pointers 22, 23 and 24 and a delay network 27.

One of the most salient features of the present invention is the use of the dual set RAMs 15A and 15B, dual three-phase RAMs 16A through 16F and dual preset counters 21A and 21B. These pairs alternate their functions once every step. This arrangement eliminates the necessity to have preprogrammed bit patterns for all possible sets of voltage/frequency (v/f) combinations representing various sine waves, and realizes any voltage level desired for a given frequency without memory means. Moreover, the arrangement assures a stable inverter operation.

Figure 3:
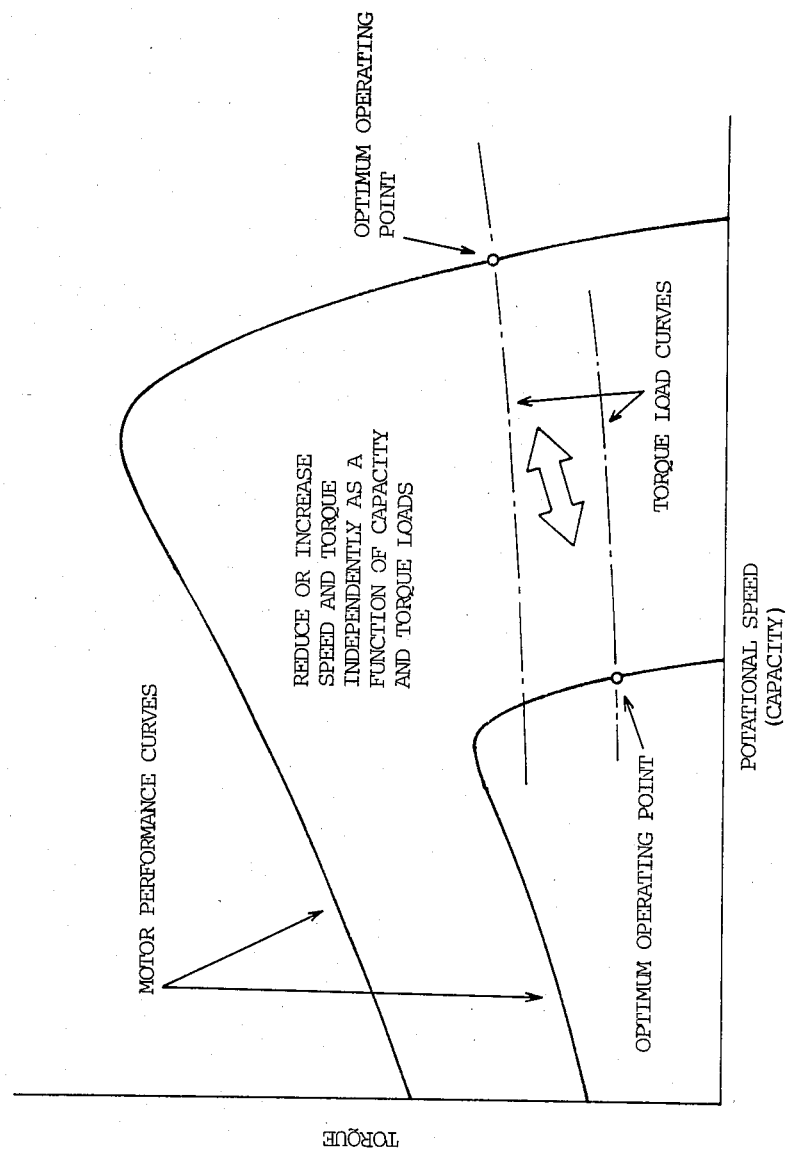
FIG. 3. is a diagram illustrating the necessity of varying the motor speed and torque independently.

FIG. 3 illustrates the necessity of varying the motor speed and torque independently to respond to a widely varying capacity and torque load demands encountered in the real world for a higher motor efficiency.

Figure 4:
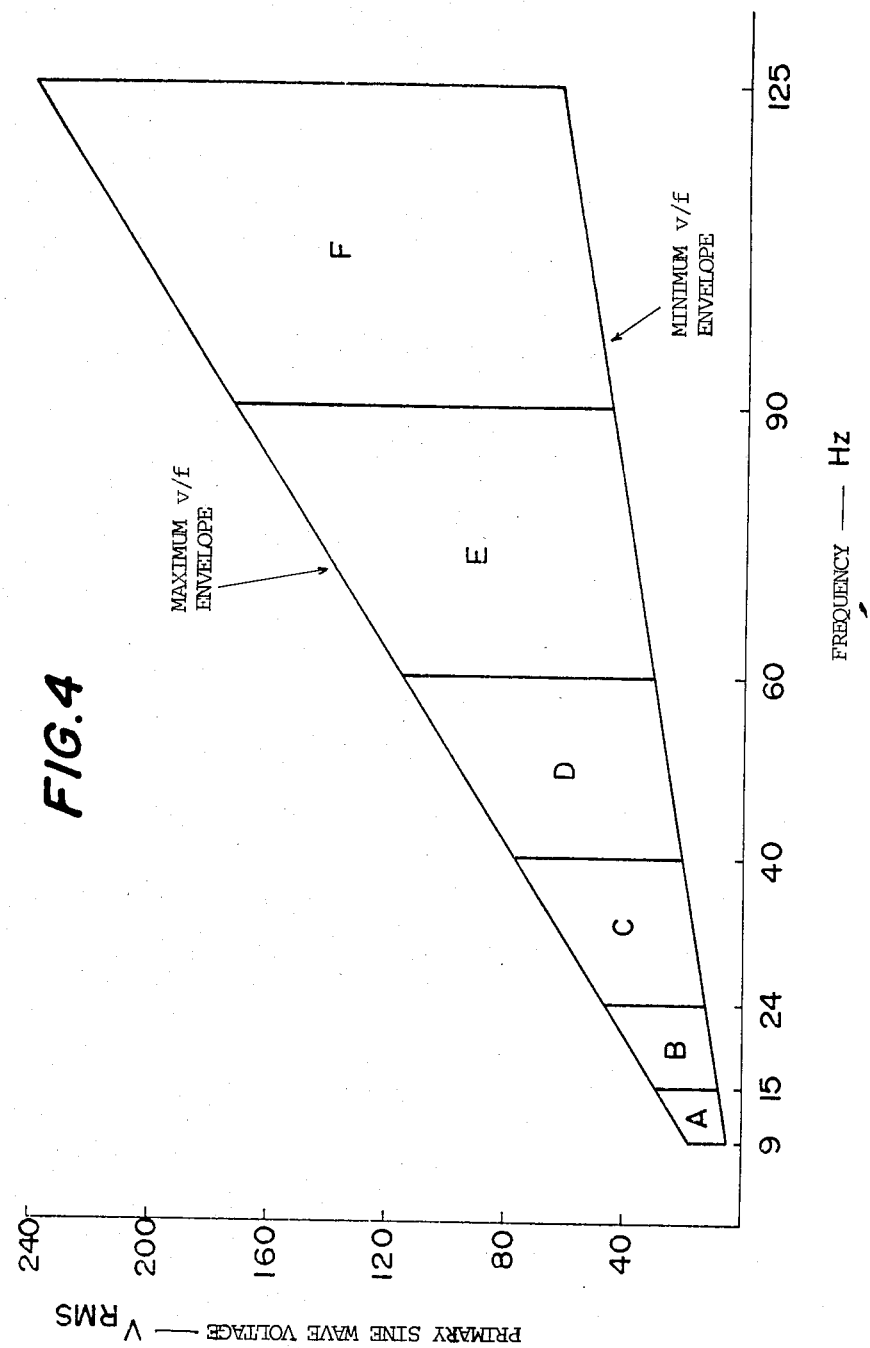
FIG. 4 is a diagram illustrating the v/f pattern segmentation made in the embodiment shown in FIG. 1.

FIG. 4 illustrates the v/f pattern segmentation made in this embodiment to satisfy both the aforementioned varying torque and near-constant carrier frequency characteristics. The maximum and minimum frequency and voltage applicable to the motor windings are specified by the electrical motor hardware. Carrier frequencies should be at least ten times as high as the fundamental sine wave frequencies. This is because then the carrier frequencies are attenuated and smoothed out by the motor windings 44A through 44C by their ten times as high impedances exhibited as the fundamental frequencies. This results in a sine wave with less distortion and consequently higher efficiency and lower noise and vibration of the motor. Center carrier frequency is arbitrarily selected at 1.2 kHz to match the highest fundamental frequency of 125 Hz. The carrier frequencies are controlled to fall between 0.9 kHz and 1.5 kHz range in the embodiment of the present invention. Notice in FIG. 4 that the larger the inverter frequencies, the wider the frequency ranges of the frequency group because the carrier frequency ranges are determined to give a near-constant ratio to the signal frequencies.

The actual calculation of carrier frequency ranges is made in FIG. 5 based on the segmentation of FIG. 4. Numbers of samplings per cycle are determined for each frequency group to be a multiple of three considering the three-phase application and to yield 1.2 kHz-centered carrier frequency range. Carrier frequencies are calculated for each frequency group by multiplying the inverter frequencies by a number of samplings as shown in FIG. 5.

Using the numbers of samplings determined in FIG. 5, FIGS. 6A–6F illustrate the sampling patterns for a sine wave with unit magnitude for six frequency groups.

It is to be noted that the sampling periods are near constant for all frequency groups in order to provide near constant carrier frequencies.

Having described the reason why the v/f pattern segmentation was done to meet both the varying torque and near-constant carrier frequency requirements, detailed description will now be set forth below on each of the general inverter functions grouped into the block diagram forms in FIG. 2.

Figure 6:
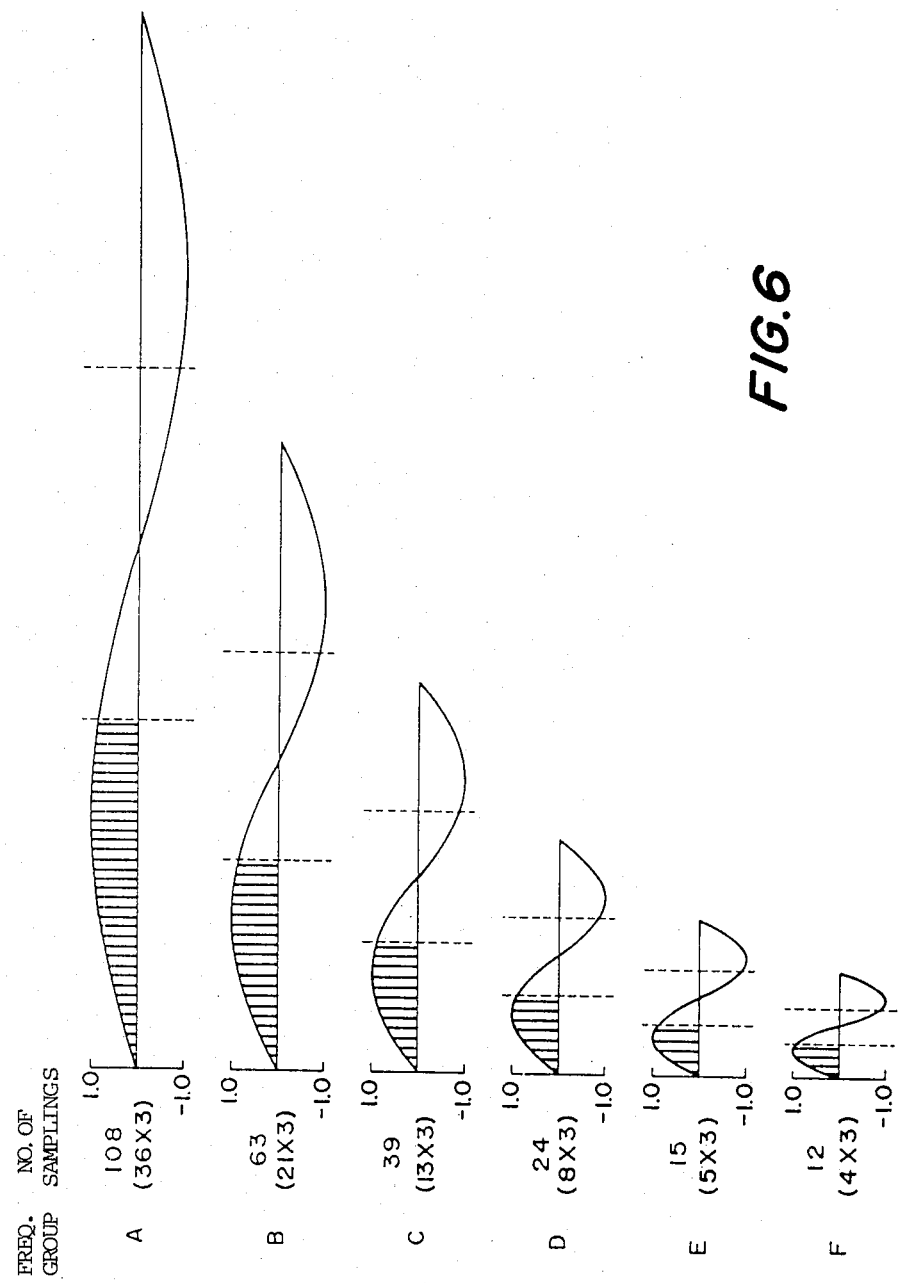
FIGS. 6A-6F are diagrams illustrating the various sampling patterns for a sine wave with unit magnitude for six frequency groups.

FIG. 7 is a table illustrating how the one-phase sine wave generator in FIG. 2 functions to generate coded sine wave sequentially from the baseline sine wave memory which is also indicated by the functional block in FIG. 2. In this process, both the desired or instructed frequency $f_{cmd}$ and voltage $v_{cmd}$ must stay within the v/f envelopes specified in FIG. 4. With the desired frequency $f_{cmd}$ and voltage $v_{cmd}$ given, the frequency group segmentation is made first. For instance, if the desired frequency were 10 Hz as shown in FIG. 7, the frequency group A will be selected. Correspondingly, the ROM address of zero will be set by a ROM address pointer located inside No. 1 microprocessor 11. If, on the other hand, the frequency group C were selected, the starting ROM address would be 108 plus 63 or 171. The number of samplings per cycle, N=108, for the frequency group A, is also set into a register in No. 1 microprocessor 11. Then the memorized set of sampled values of sine wave with unity magnitude {A}, of which sampling pattern is shown in FIG. 6, is successively transferred from the ROM 13 to No. 1 microprocessor 11 where it is multiplied by $\sqrt{2}$ times desired voltage $v_{cmd}$. The reason why $\sqrt{2}$ is needed lies in the fact that the peak value of sine wave is used for quantizing and coding while the desired voltage $v_{cmd}$ is given generally in terms of the root-mean-square (rms) value which is $1/\sqrt{2}$ of the peak value. The voltage weighted set of sine function {x} is thus generated.

Figure 8:
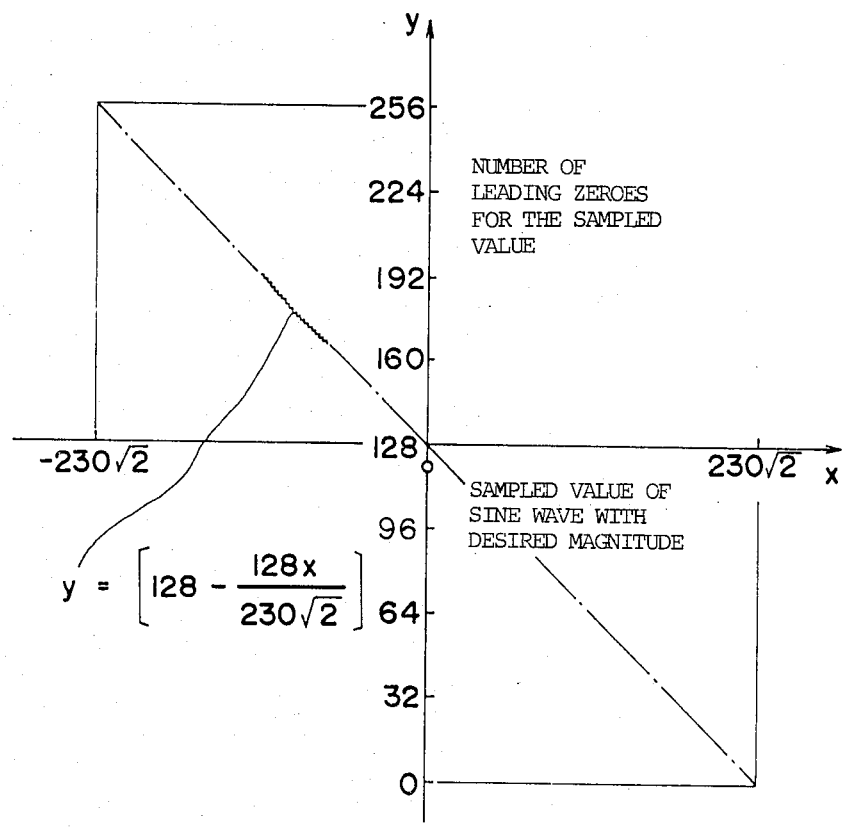
FIG. 8 is a diagram illustrating the manner of quantizing the function {x}.

The function {x} is then quantized into 256 discrete levels as shown in FIG. 8 by a function indicated therein as an example and coded by the number of leading zeros ("0"s) for that sampling into an 8-bit binary (byte) data. The gradient of the quantizing function as given in FIG. 8 can be varied by the No. 1 microprocessor 11 to give a finer voltage selection. The coded data are successively stored in the writing portion of the set RAM 15A or 15B.

Figure 9:
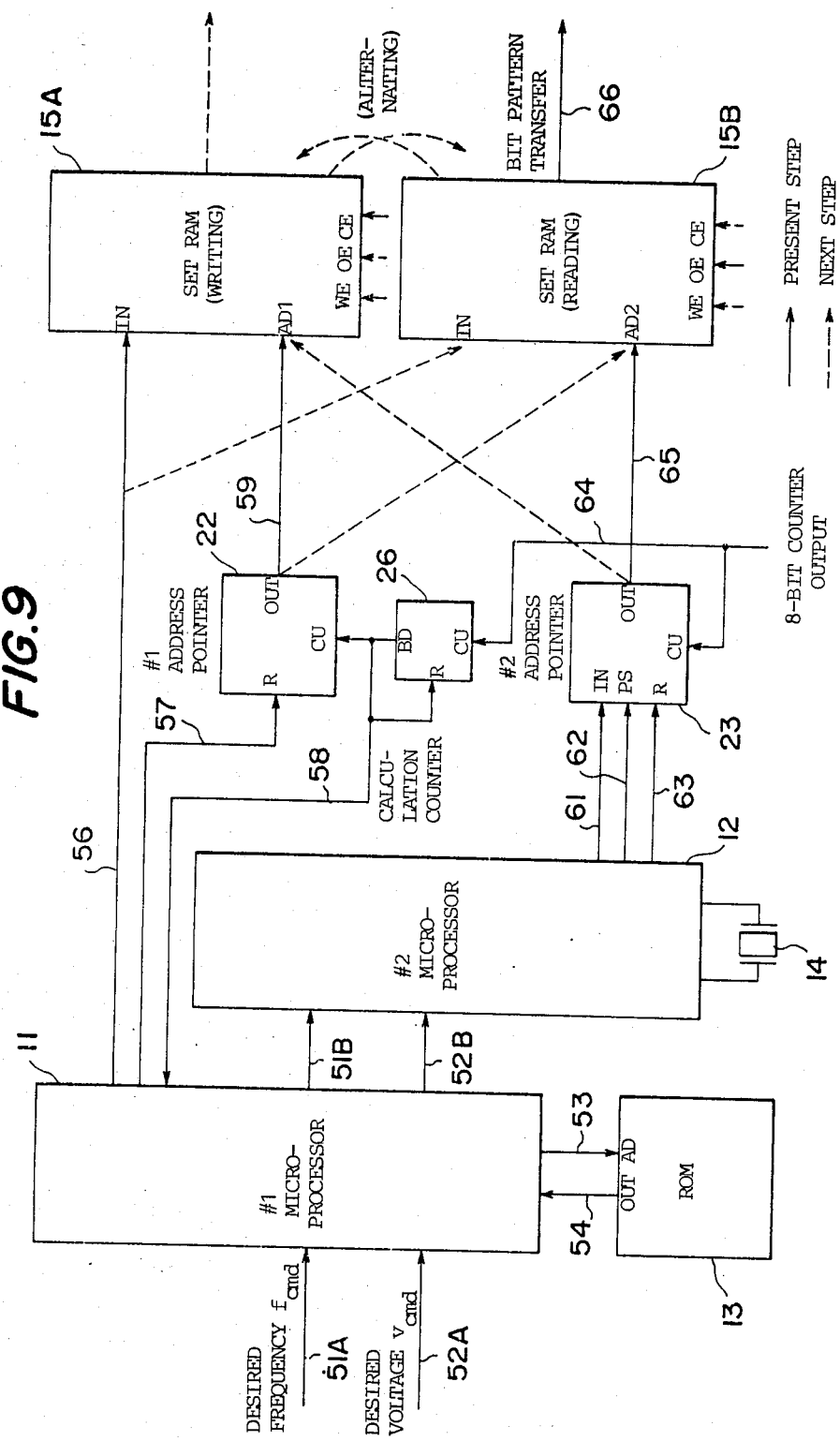
FIG. 9 is a block diagram showing a detailed embodiment of a hardware for quantizing the function {x}.

The aforementioned process is explained by referring to a hardware shown in FIG. 9. First, the desired frequency $f_{cmd}$ is given on lines 51A and 51B. From this information, the frequency group segmentation is made within No. 1 microprocessor 11. The number of samplings N and the starting address of the ROM 13 are set in No. 1 microprocessor 11. The ROM address is directed via line 53 and the content of the ROM corresponding to the address is returned via line 54 to No. 1 microprocessor 11.

One-phase sine wave generation is made within No. 1 microprocessor 11 with the desired voltage $v_{cmd}$ supplied from lines 52A and 52B. The coded data are successively transferred to the writing portion of set RAM 15A or 15B through line 56 which is an 8-bit parallel bus. The address of the writing portion (AD1) of the set RAM 15A or 5B is taken from the output (OUT) of No. 1 address pointer 22 via line 59 while that of the reading portion (AD2) is read from the output (OUT) of No. 2 address pointer 23 via line 65. The count-up signal (CU) for No. 1 address pointer 22 is generated from the overflow terminal (BD) of the calculation counter 26 on line 58 by appropriately counting up the pulses issued from the 8-bit counter 25 on line 64. The signal on line 58 is also applied to the reset terminal (R) of the calculation counter 26 and to No. 1 microprocessor 11. No. 1 microprocessor 11 issues a reset signal for No. 1 address pointer on line 57. No. 2 address pointer 23 is coupled to No. 2 microprocessor 12 and the reading portion of set RAM 15A or 15B with lines 61, 62, 63 and 65, details of which will be explained later.

As shown in FIG. 9, the use of the writing and reading portions of set RAMs 15A and 15B is altered once every update cycle. This is done by enabling or disabling the lines 59 and 65 going into appropriate portions of set RAMs 15A and 15B (logic not shown) and sending write enable (WE) or output enable (OE) signals to the respective set RAM 15A or 15B. The chip enable terminals (CE) of the set RAMs 15A and 15B are always provided with enabling signals.

Bit pattern information stored in the set RAM 15A or 15B is transferred via line 66 to the three-phase RAMs 16A through 16F.

Figure 10:
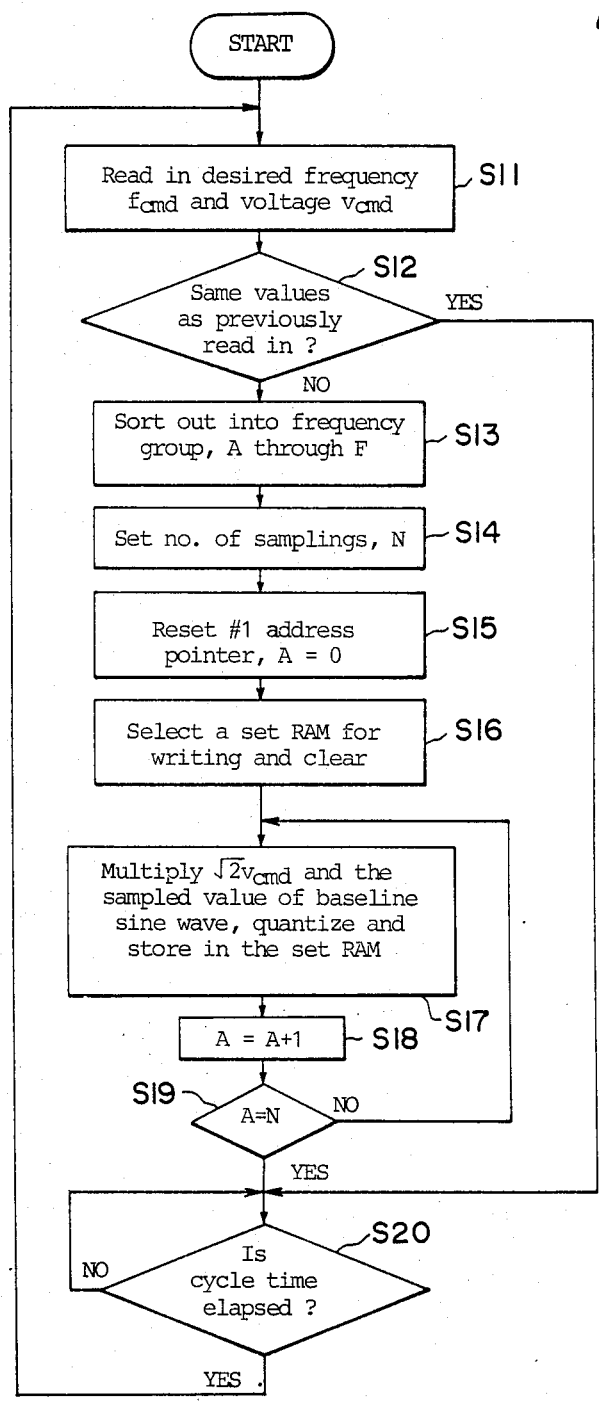
FIG. 10. is a flow chart showing an example of the manner of controlling the hardware shown in FIG. 9.

The corresponding flow chart is offered in FIG. 10. In step S11, the desired frequency $f_{cmd}$ and desired voltage $v_{cmd}$ are read into No. 1 microprocessor 11 when the cycle time dictates to do so. At step S12, the values of $f_{cmd}$ and $v_{cmd}$ are compared with the previously read-in values. In case they are the same, the program jumps to step S20 and waits for the next cycle time to come. Otherwise it branches to steps S13 through S16 for initialization to new values. The initialization process includes frequency group segmentation (S13), number of samplings determination (S14), No. 1 address pointer resetting (S15), and selection and resetting of the writing portion of the set RAM 15A or 15B (S16). The program then goes to step S17 where the sampled value of baseline sine wave from the ROM 13 is multiplied by the peak value of desired voltage or $\sqrt{2}\, v_{cmd}$, quantized, coded and stored in the set RAM 15A or 15B. After the step S17, No. 1 address pointer 22 is incremented. Steps S17 and S18 are repeated for the number of samplings N specified. If the specified number of iteration is judged to be performed at step S19, the program proceeds to step S20 where the program waits for the next cycling to come when the specified cycle time is elapsed. If the cycle time is judged elapsed at step S20, the program goes back to step S11 and repeat the cycling.

It is seen in FIG. 2 that data transfer is made from the one-phase sine wave memory to the three-phase sine wave generator. An embodiment of hardware arrangement is given in FIG. 11 to carry out the specified function of the present invention.

The data transfer from the set RAM 15A or 15B to three-phase RAMs 16A through 16F is primarily governed by both No. 2 address pointer 23 and No. 3 address pointer 24. To generate the V- and W-phase sine waves from a U-phase sine wave, an illustrated reading sequence from the set RAM 15A or 15B should be made using No. 2 address pointer 23. In this embodiment, functions enclosed by dot and dash lines are preferably performed by general purpose registers and counters contained inside No. 2 microprocessor 12. However, they were treated here as though dedicated special hardware rather than general purpose elements in order to clarify the functional relationship between each of them.

An address counter 84 delivers on line 63 the reset signal (R) for No. 2 address pointer 23. This reset signal on line 63 is also applied to the reset terminal (R) of the address counter 84. Preset signals (PS) applied to both No. 2 address pointer 23 and address counter 84 are obtained from line 62 by delaying the signal on line 63 by a delay network 81. Count-up (CU) or count-down (CD) signals for No. 2 address pointer 23 and the address counter 84 are provided from the 8-bit counter 25 on line 64.

Count-down signal (CD) for a cycle counter 85 is provided on line 69 from the borrow terminal (BW) of No. 3 address pointer 24. The BW terminal of the pointer 24 issues a clock signal once every N iterations of the cycling. The cycle counter 85 sets its 2-bit output on line 73 of which value is either 0, 1 or 2 depending on the number of pulses applied to its count-up terminal (CU) representing the cycle number. Before making the data transfer, the cycle counter 85 is automatically reset with a signal applied at the reset terminal (R) on line 72. A cycle decoder 86 decodes the parallel 2-bit input applied to its input terminal (IN) into discrete signals 0, 1 or 2 corresponding to the cycle number by enabling either one of lines 74, 75 or 76, respectively. No. 2 address pointer 23 and the address counter 84 are provided with different numerical values on their input terminals (IN) via lines 61 and 79 in accordance with the cycle number. When the cycle number is 0, the content of No. 2 address pointer 23 is preset to 0 (77A) and the content of address counter 84 is preset to N(78A). When the cycle number is 1, the content of No. 2 address pointer 23 is preset to 2N/3-1 (77B) and the content of address counter 84 is preset to N/3 (78B). And when the cycle number is 2, the content of No. 2 address pointer 23 is preset to N/3-1 (77C) and the content of address counter 84 is preset to 2N/3 (78C).

Figure 11:
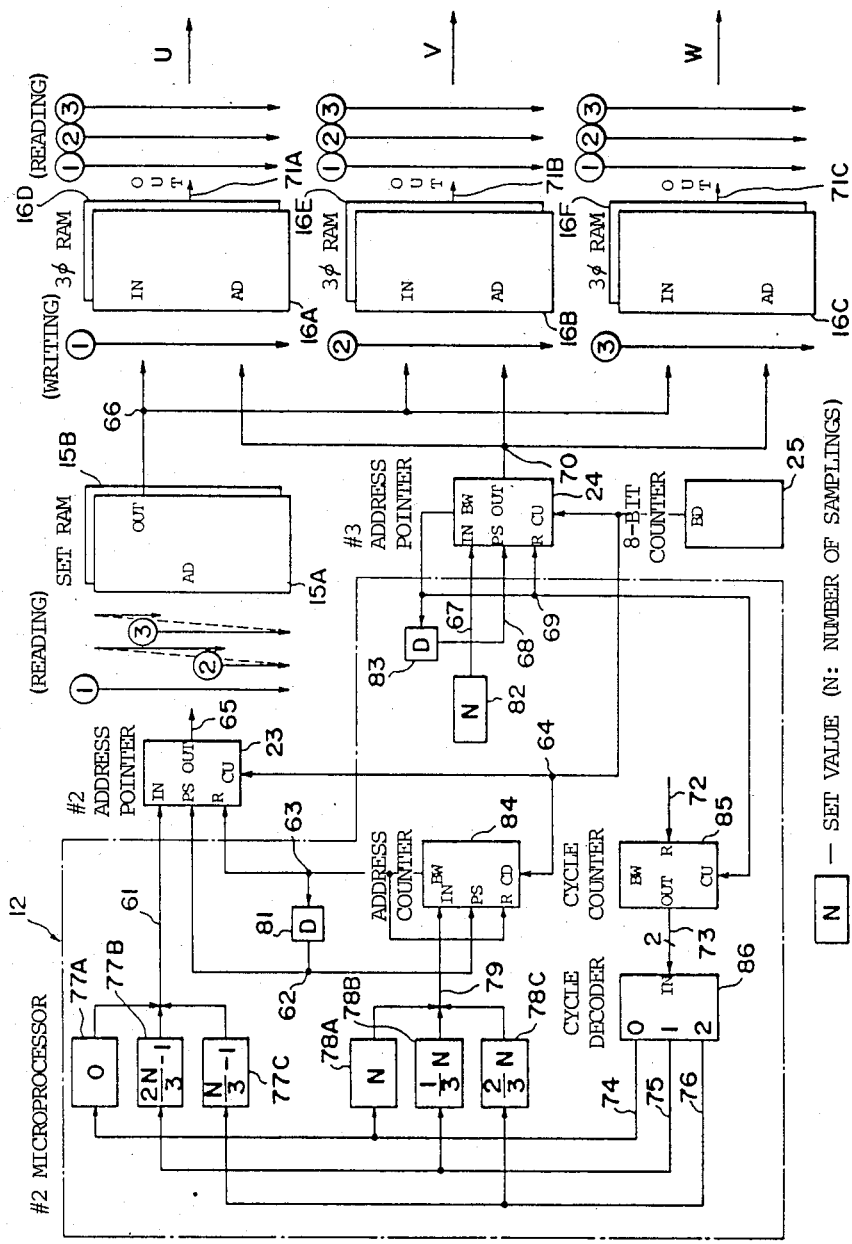
FIG. 11 is a block diagram showing a detailed embodiment of the data transfer from the one-phase sine wave memory to the three-phase sine wave generator.

Aforementioned procedure allows the reading of the set RAM 15A or 15B as illustrated in FIG. 11 thus generation of the three-phase sine waves from one-phase. The writing and reading of the three-phase RAMs 16A through 16F is performed by using No. 3 address pointer 24 of which 8-bit output is delivered via line 70. The count-up signal (CU) for No. 3 address pointer 24 is provided on line 64 from the 8-bit counter 25. The number of samplings N(82) is preset to the content of No. 3 address pointer 24 from its input terminal (IN) through line 67 with the preset signal (PS) applied on line 68. The preset signal is derived from the signal on line 69 by passing it through a delay network 81. The signal on line 69 is also used to reset the pointer 24.

To enable one of the three possible three-phase RAMs for data transfer from the set RAM 15A or 15B, either one of write enable terminals (WE) of the three-phase RAMS 16A through 16F is energized in accordance with the cycle number indicated by the cycle decoder 86, although the detailed circuit connection is not shown on FIG. 11. On the other hand, output enable (OE) and chip enable (CE) terminals of the three-phase RAMs 16A through 16F are always energized for reading the three-phase RAMs 16A through 16F simultaneously. The output from the three-phase RAMs 16A through 16F are provided from lines 71A, 71B and 71C, each of which consists of 8-bit bus.

Figure 12:
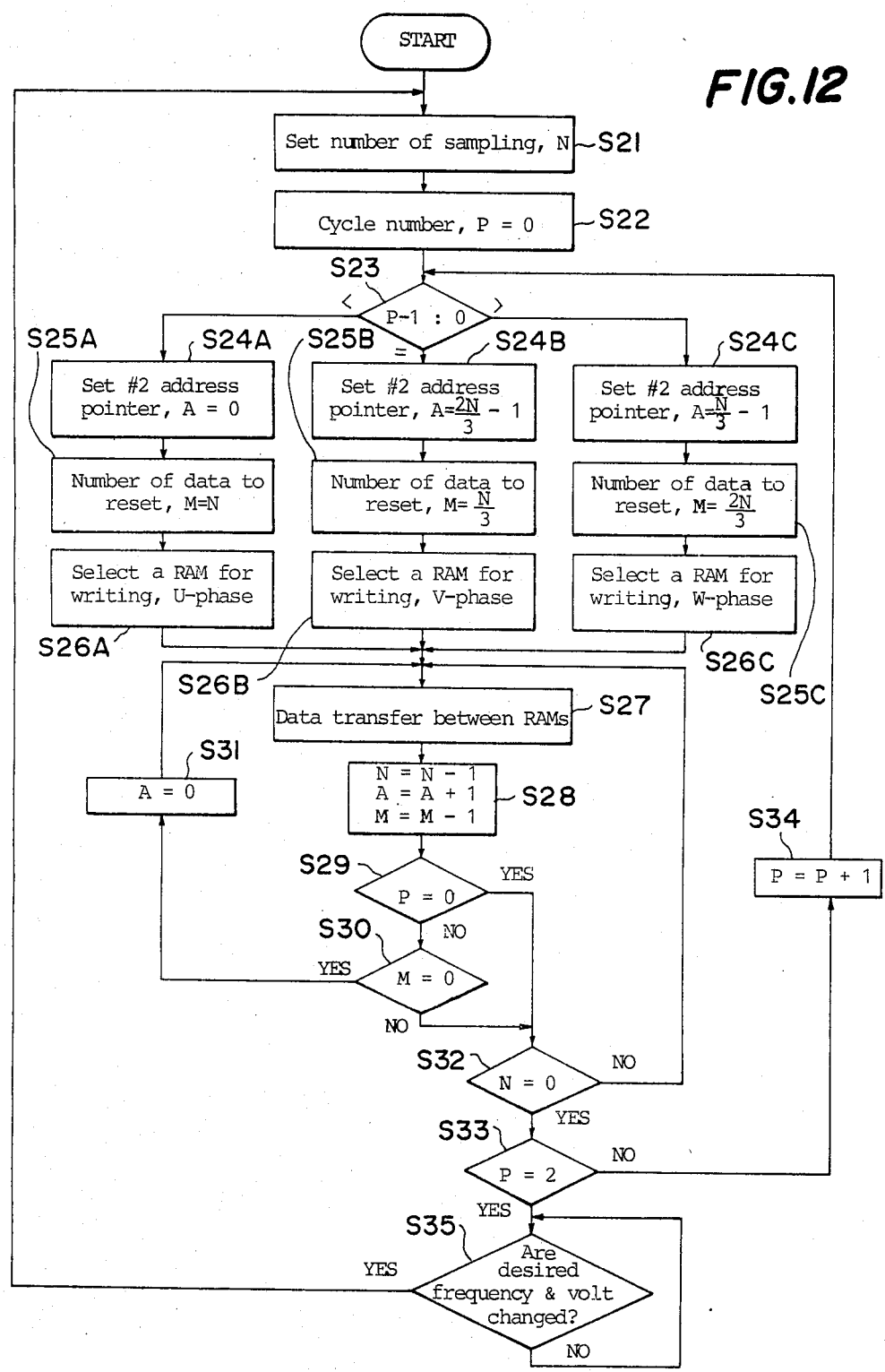
FIG. 12 is a flow chart showing an example of the manner of controlling the circuit shown in FIG. 11.

Corresponding flow chart is shown in FIG. 12. After starting the program, steps S21 and S22 are entered for initializing the number of samplings N and the cycle number P. Then, at step S23, the cycle number P is checked whether it is 0, 1 or 2. If the cycle number P were 0, steps S24A S25A and S26A are performed. If P=1, steps S24B, S25B and S26B are performed. If P were 2, steps S24C, S25C and S26C. During these steps, No. 2 address pointer 23 is preset to an appropriate address, the address counter 91 is preset to an appropriate number of iterations and either one of the writing portions of three-phase RAMs 16A through 16F are selected and reset. After the above initialization, data transfer from the set RAM 15A or 15B to the three-phase RAMs 16A through 16F is made in step S27 by one sampling data per every iteration. Then at step S28, necessary increment or decrement is made for the number of samplings N, for the content B of No. 2 address pointer 23, and for the content M of the address counter 84. After step S28, step S29 is entered where it is judged whether this is the first cycle or P=0 or not. If it were the first cycle, the program jumps to step S32. Otherwise it goes to step S30 where it is determined whether No. 2 address pointer 23 should be reset or not. If it is judged to be reset, or M=0, the program branches to step S31 where the content of No. 2 address pointer is reset, B=0, and goes back to step S27. If it were M>0 at step S30, the program enters step S32 where judgment is made whether all N data transfer has been completed. If it is negatively judged, the program goes back to step S27 and continue the data transfer. If it is positively judged, then the program goes into step S33 where it is judged whether three cycling has been completed, or P=2, or not. If P were less than two, the program branches to step S34, where the cycle number is incremented, and goes back to step S23 to repeat data transfer to other phase(s). If P were two at step S33, the program proceeds to step S35 where the status is checked whether the desired frequency and voltage changes have occurred during the past cycle. If it is judged that the changes have not happened, the program loops around step S35. When the changes should have happened the program goes back to step S21 to make a new data transfer.

It is shown in block diagram form in FIG. 2 that a decoded or pulse width modulated six-phase sine wave is obtained from the three-phase sine wave memory. Consider this function more closely now by referring to FIGS. 13 to 15.

Figure 13:
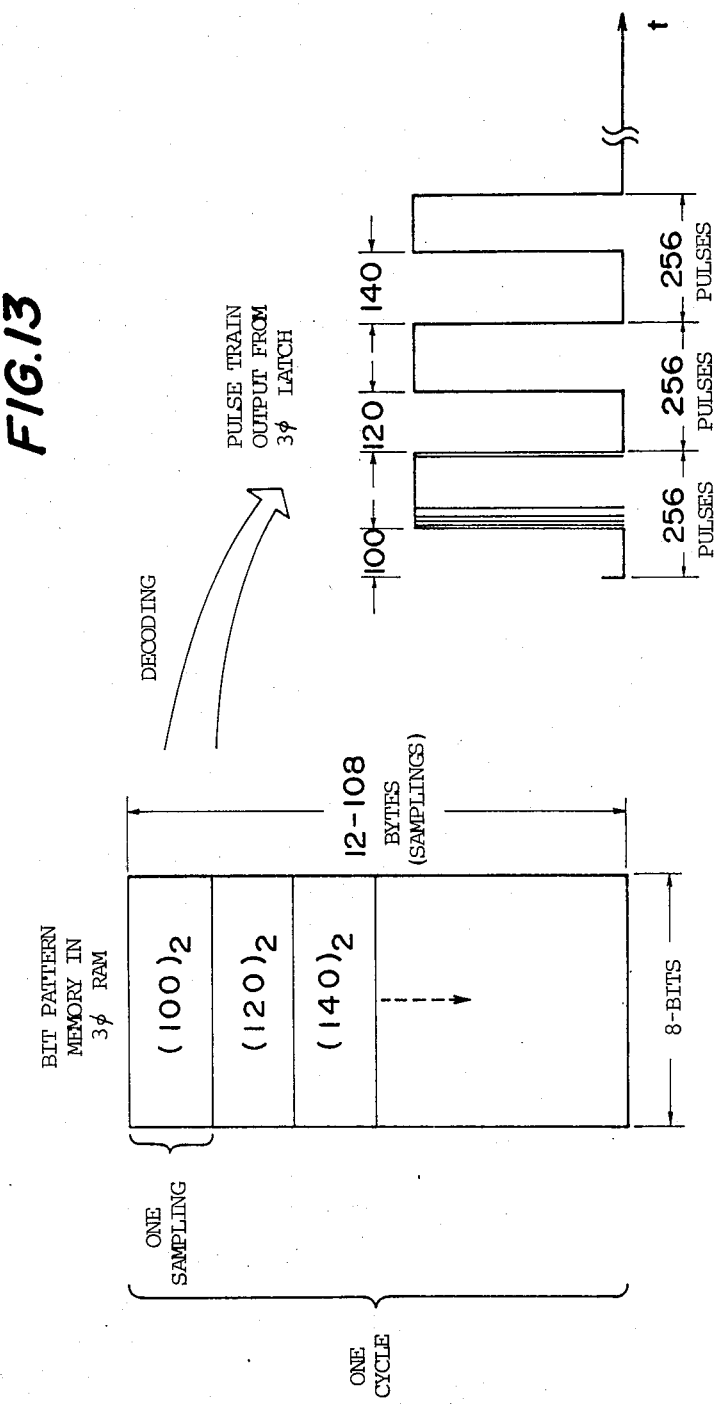
FIG. 13 is a schematic diagram illustrating a way of decoding the coded bit patterns.

FIG. 13 schematically illustrates how coded bit patterns stored in the three-phase RAMs 16A through 16F are decoded by the three-phase preset counters 17A, 17B and 17C and latches 18A, 18B and 18C into pulse width modulated sine waves. As indicated previously, sine wave sampling is made at different rates ranging from 12 to 108 and one sampling always has 256 quantizing levels. The three-phase RAMs 16A through 16F memorize the number of leading zeros only in a binary form representing quantized sampling values. The number of ones is automatically determined by taking the 256's complement of the number of zeros.

Figure 14:
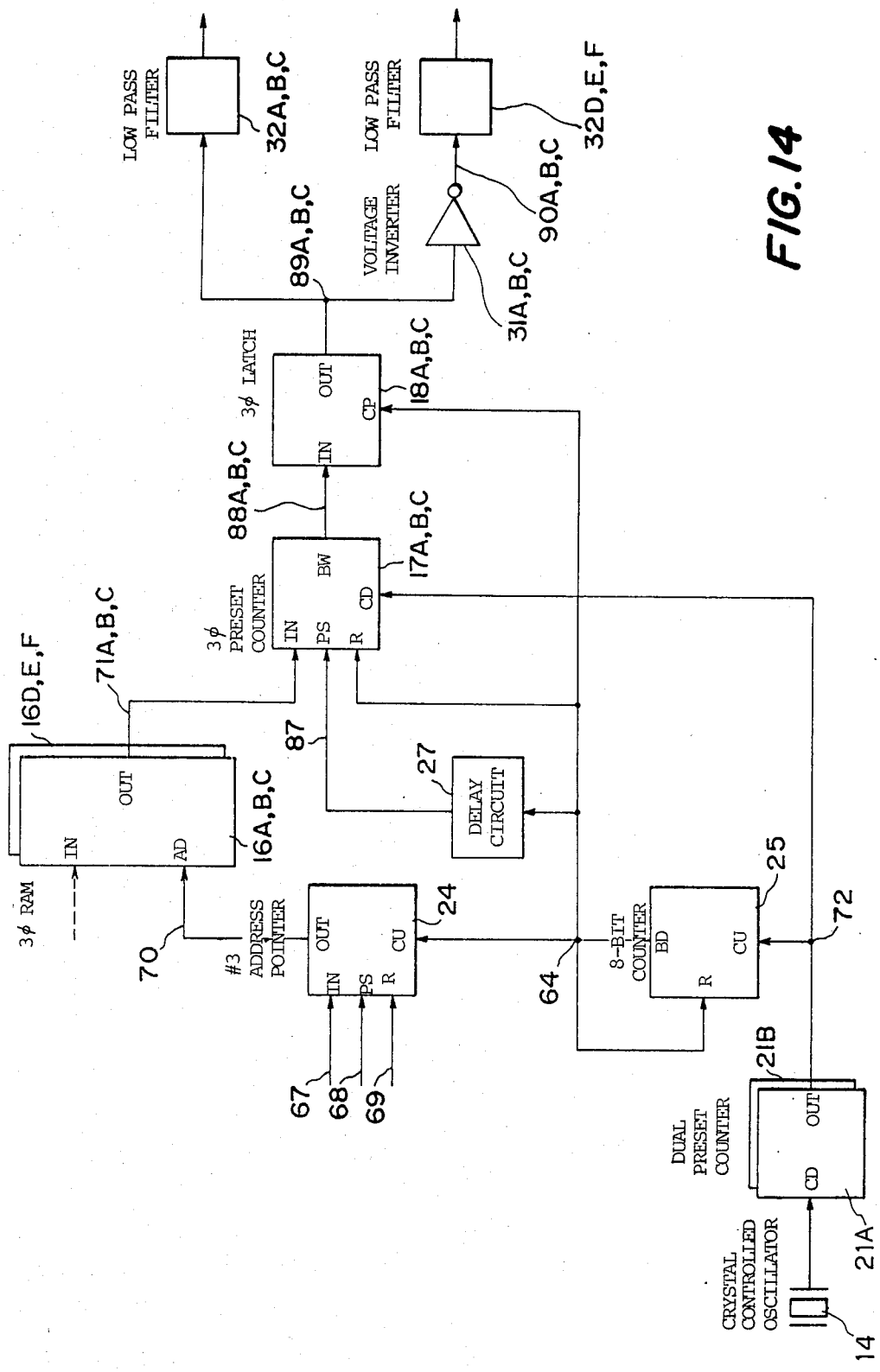
FIG. 14 is a block diagram showing a detailed embodiment of the six-phase decoding portion.

FIG. 14 is an embodiment of the present invention to perform the six-phase decoding from the coded bit pattern memory stored in the three-phase RAMs 16A through 16F.

A dual preset counter 21A or 21B issues a variably timed clock pulse on line 72 which provides the count-up signal (CU) for the 8-bit counter 25 and the count-down signal (CD) for the three-phase preset counters 17A, 17B and 17C. The variably timed clock pulse is generated from the dual preset counter 21A or 21B by counting down the base clock signal supplied from the crystal controlled oscillator 14.

The three-phase preset counters 17A, 17B and 17C and the three-phase latches 18A, 18B and 18C are reset once every 256 times of application of the count-down signal to the CD terminals and the CP terminals, respectively. This reset signal is generated from the 8-bit counter 25 on line 64. After resetting the preset counters 17A, 17B and 17C, a preset signal (PS) is provided on line 87 from a delay circuit 27 by delaying the signal on line 64. Upon application of the preset signal, new binary data are loaded into the preset counters 17A, 17B and 17C from their input terminals (IN) being transferred from the three-phase RAMs 16A through 16F via lines 71A, 71B and 71C. The borrow bits (BW) of the preset counters 17A, 17B and 17C are kept at high levels until the number of count-down signal exceeds the preset value. When the number of count-down signal exceeds the preset value, BW turns to low level momentarily and is applied to the IN terminal of the three-phase latches 18A, 18B and 18C to change the polarity of the output signal levels. When 256 count-down pulses are applied to the R terminal, new preset valves are loaded into the preset counters 17A, 17B and 17C and the cycle repeats itself. The three-phase latches 18A, 18B and 18C hold the output signal levels until a reset pulse is provided to their CP terminals. The outputs of the latches 18A, 18B and 18C are put on lines 89A, 89B and 89C. Lines 89A, 89B and 89C are branched into two portions and the signal levels of one portion are inverted their polarities by voltage inverters 31A, 31B and 31C with their outputs on lines 90A, 90B and 90C. This completes the six-phase decoding of the information stored in the three-phase RAMS 16A through 16F.

Low pass filters 32A through 32F are provided to delay the rise-up time of the signals applied on lines 89A, 89B and 89C, and 90A, 90B and 90C thus avoiding the short circuits between the tandemly connected power transistors. The address of the three-phase RAMs 16A through 16F is dictated by No. 3 address pointer 24 with the values on line 70. The count-up signal (CU) for No. 3 address pointer 24 is provided from the 8-bit counter 25 on line 64. The reset signal (R) is applied to No. 3 address pointer 24 when all N data transfer has been completed which can be detected by comparing the present number of count-up signals with the preset value. The preset value is loaded into the address pointer 24 from the input terminal (IN) via line 67 when the preset signal is applied to its preset terminal (PS) via line 68.

Figure 15:
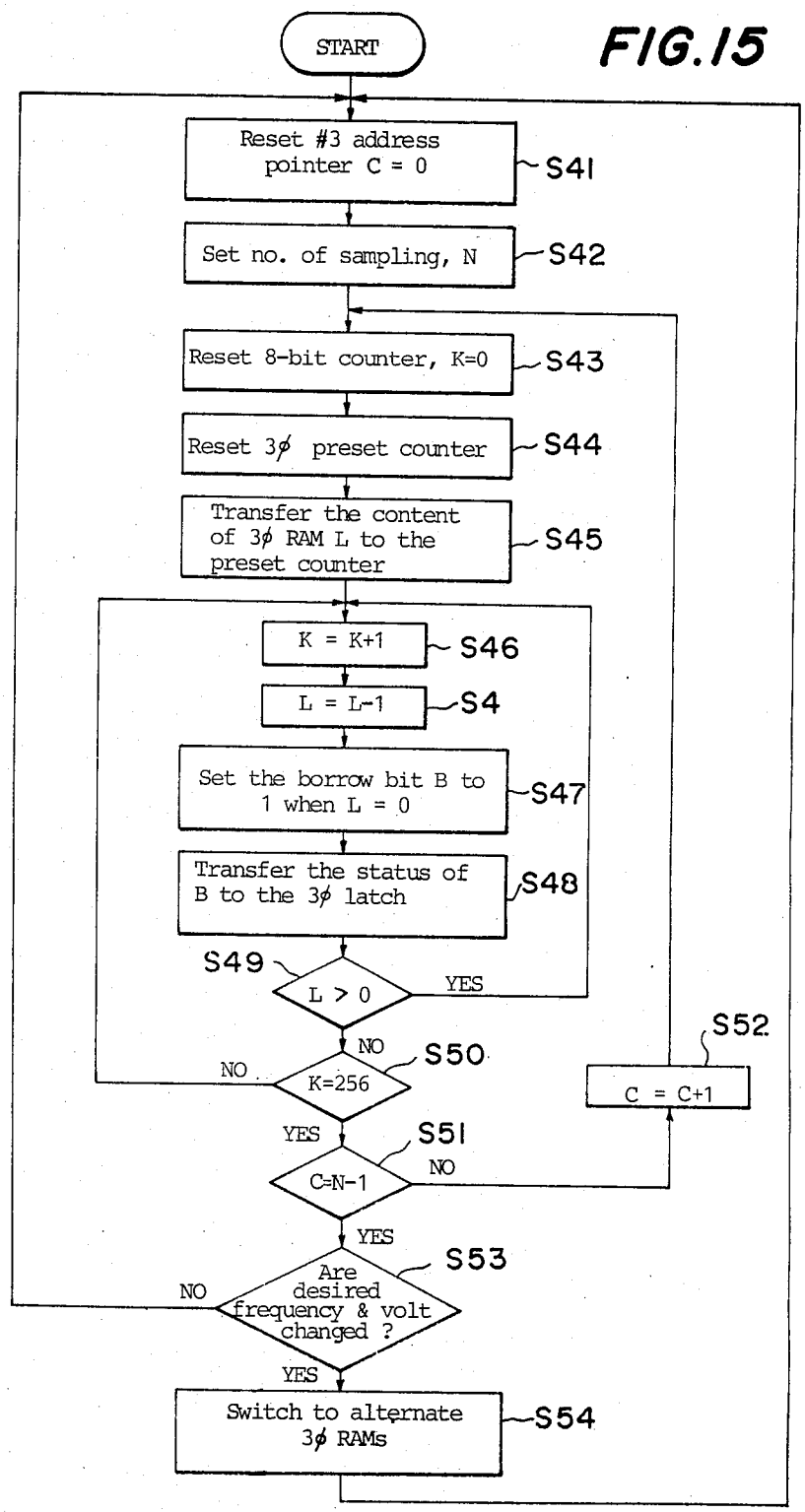
FIG. 15 is a flow chart showing an example of the manner of controlling the six-phase decoding portion shown in FIG. 14.

Corresponding flow chart is given in FIG. 15. After starting the program, No. 3 address pointer 24 is reset C=0 in step 41 and a number of samplings data N is preset when preset signals are applied in step S42. Then, in steps S43 through S45, the 8-bit counter 25 is reset, and the three-phase preset counters 17A, 17B and 17C are reset and loaded with new binary data from the three-phase RAMs 16A, 16B and 16C. Data transfer iteration continues around steps S46 through S49 during of which the contents of the 8-bit counter 25 and preset counters 17A, 17B and 17C are incremented and decremented, respectively. The borrow bits of the preset counters 17A, 17B and 17C are set to one when their contents are decremented to zeros, and the status of the borrow bits is then transferred to the three-phase latches 18A, 18B and 18C. Whenever the content of the preset counters is positive at step S49 the program goes back to step S46, otherwise the program enters step S50 where it is judged whether all 256 quantizing bits per sampling have been decoded or not. If the answer is negative, the program goes back to step S46 and if the answer is positive, the program proceeds to step S51 and the content C of No. 3 address pointer 24 is compared with the number of samplings minus one or N−1. If C<N−1, C is incremented in step S52 and goes back to step S43. If C=N, the program goes into step S53 where it is judged whether desired frequency and/or voltage changes are requested during the past cycle. If the changes are not requested, the program simply returns to step S41. If the changes are requested, then in step S54, switch is made to alternate three-phase RAMs 16A through 16F and goes back to step S41.

Lastly, a function of timing signal generator shown in FIG. 2 is described in detail below referring to FIG. 16 through FIG. 18.

FIG. 16 is a table tabulating the selectable frequencies based upon a clock pulse period and the number of clock pulses per cycle. In this embodiment according to the present invention, the use of 6 MHz crystal controlled oscillator is made for the base clock signal generation. Then using the formulae shown in the footnote of FIG. 16, a total of 56 selectable frequencies is obtained by possible combinations of the clock pulse period and the number of clock pulses per cycle.

Figure 17:
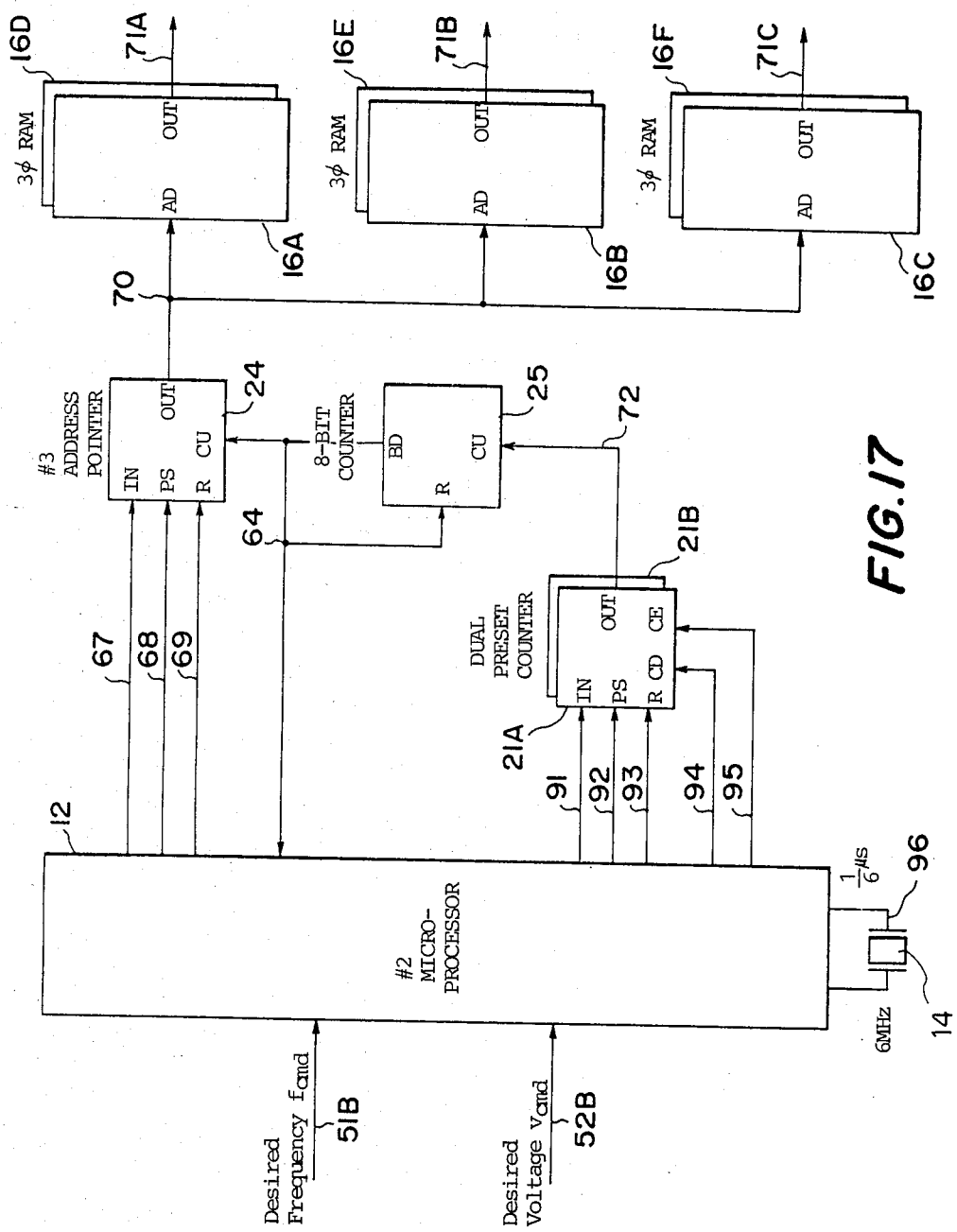
FIG. 17 is a block diagram showing a detailed embodiment of the hardware arrangement which realizes the scheme of FIG. 16.

FIG. 17 depicts an example of hardware arrangement to realize the scheme of FIG. 16. In relation to FIG. 14, the operations of No. 3 address pointer 24 and the 8-bit counter 25, are already described along with the reading of the dual three-phase RAMs 16A through 16F. Therefore, the operation of the dual preset counter 21A or 21B is primarily explained below.

The dual preset counter has two identical counters 21A and 21B. Two are used alternately each other for one full sine wave cycle. An active counter is referred here as working portion, an idling counter as waiting portion. The switch of counters is made by enabling or disabling the chip enable terminals (CE) of the dual preset counters 21A and 21B by sending a signal on line 95. A base clock signal is generated by the crystal controlled oscillator 14. Present invention assumes the use of 6 MHz oscillation frequency so that the base clock period is 1/6 micro-seconds. This base clock signal is put on line 94 through No. 2 microprocessor 12 and line 96, which is then applied to the count-down terminal (CD) of the preset counter 21A or 21B.

Based on the desired frequency input $f_{cmd}$ on line 51B for the next cycle, both frequency group segmentation and clock pulse group segmentation are made within No. 2 microprocessor 12. The frequency group segmentation determines the number of samplings N and the clock pulse group segmentation determines the number of clock pulses Q. Then the number of samplings N is output on line 67 and the number of clock pulses Q on line 91. The waiting portion of the dual preset counter 21A or 21B accepts new data on line 91 from its input terminal (IN) when the preset signal (PS) is applied on line 93. The preset signal is generated once per cycle after the application of a reset signal (R) on line 93. The reset signal is generated when the U-phase sampling completes its cyclic action. In this embodiment, the timing origin is selected to coincide with the zero-degree phase angle for the U-phase sine wave. When the reset signal is applied on line 93, the signal on line 95 changes its level so that the counter swapping is taking place.

With the number of base clock pulses data Q preset in the working portion of the dual preset, counter 21A or 21B, it issues a variably timed first level clock signal from the output terminal (OUT) on line 72. The clock pulse period varies from 16/6 to 26/6 micro-seconds depending upon the numerical value of Q which is selectable from 16 to 26. The 8-bit counter 25 counts down its input 256 times so that it delivers a pulse every 256 clock pulses applied to its input, corresponding to one sampling. From the number of samplings data, N, inputted to No. 3 address pointer 24, it automatically multiply the number of samplings N by number of quantizing, 256 to obtain the actual preset data. When the preset signal (PS) is applied on line 68, a new N value, ranging from 12 to 108 is loaded into No. 3 address pointer 24. The preset signal is generated from the reset signal within No. 2 microprocessor 12. The reset signal is in turn generated in No. 2 microprocessor 12 when the present number of pulses provided from the 8-bit counter 25 via line 64 coincides with the number of samplings N specified.

By employing the dual counter technique, the reading of the three-phase RAMs 16A through 16F can be done smoothly without intermission, and moreover, there is little fear of losing synchronization between U-, V- and W-phases of sine waves.

Figure 18:
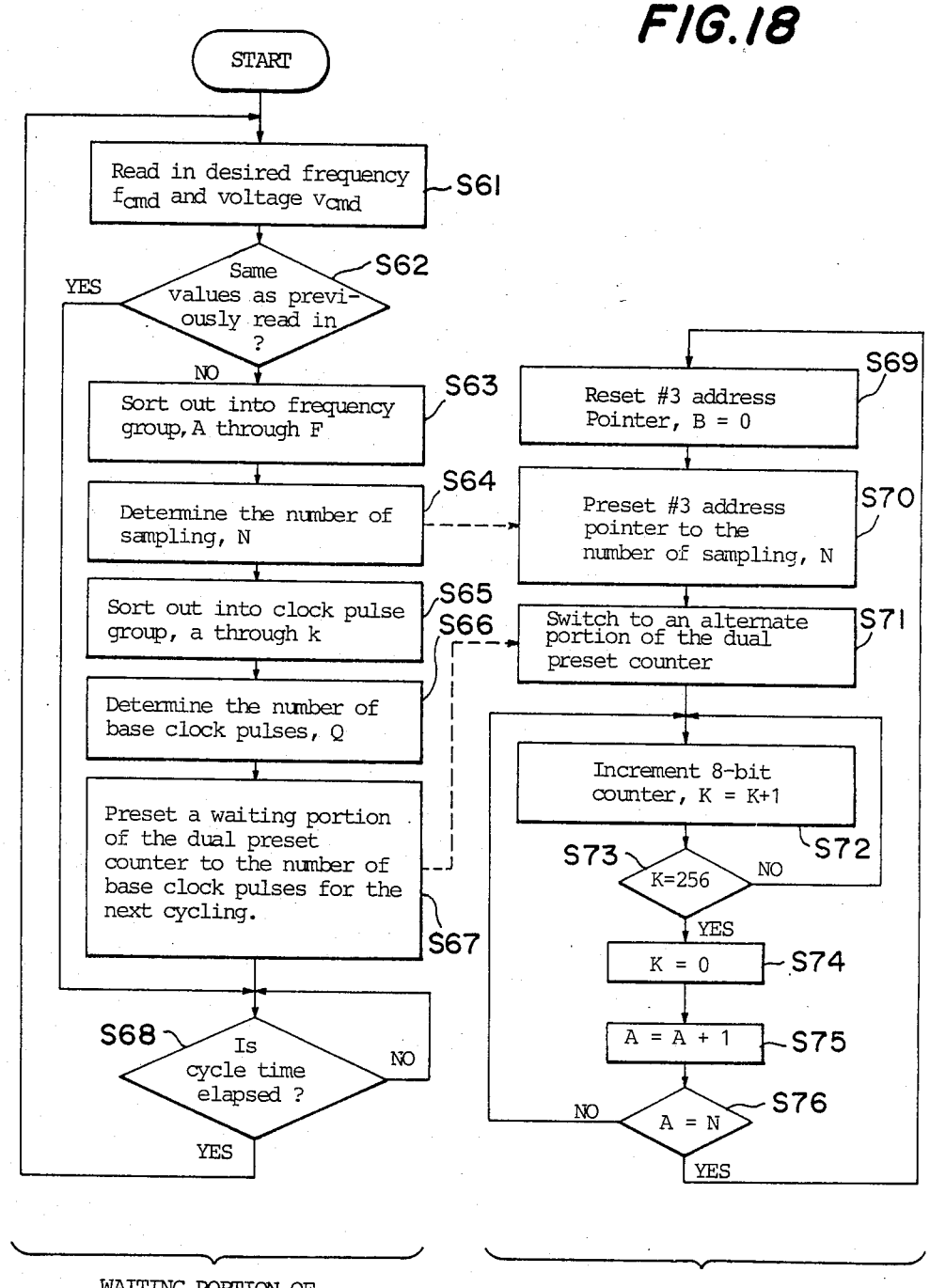
FIG. 18 is a flow chart showing an example of the manner of controlling the hardware arrangement shown in FIG. 17.

Corresponding flow chart is given in FIG. 18. In this chart, the left-hand side mainly represents the program associated with the waiting portion of the dual preset counter 21A or 21B, the right-hand side, the working portion. After starting the program, the desired frequency $f_{cmd}$ and voltage $v_{cmd}$ are read in at step S61. New values are compared with the previous values in step S62. If both are the same, the program jumps to step S68 where it waits for the next cycle time to come. If new values are different from the previous ones, then the program proceeds to steps S63 through S66, where frequency group and clock pulse group segmentations are made again and the number of samplings and number of base clock pulses are determined. Then in step S67, the waiting portion of the dual preset counter 21A or 21B is preset to the number of base clock pulses obtained for the next cycling.

After completion of all N data scanning by No. 3 address pointer 24, its content is reset to zero in step S69. Then it is preset to a new number of samplings provided from step S64. At step S71, switch is made to the waiting portion of the dual preset counter 21A or 21B with a new number of base clock pulses. Completing the initialization in steps S69 through S71, the program enters into the iteration cycle consisting of steps S72 through S76. In step S72, the content of the 8-bit counter 25 is incremented once every clock pulse applied to its input. Step S73 judges if 256 pulses are applied or not. If the answer is negative, the iteration continues by going back to step S72. If the answer is positive, the content of the 8-bit counter 25 is reset at step S74 and the content C of No. 3 address pointer 24 is incremented at step S75. Then in step S76, the content A of the address pointer 24 is compared with the number of samplings N given. If the former is less than the latter, the program goes back to step S72 where it repeats the iteration. If C=N, the program loops back to step S69 to repeat the cycling.

As described above, a more complicated, precise and efficient inverter operation becomes possible with a low-cost software-based inverter. The microcomputer logic portion is preferably made of a couple of large-scale integrated circuits (LSI) so that the scale of the inverter is also minimized.

As will be apparent to those skilled in the art, various changes and modifications may be made to the present invention without departing from the spirit and scope of the invention as recited in the claims and their legal equivalent.

What is claimed is:

1. An inverter for calculating and encoding a pulse width modulated sine wave on a semi-real time basis upon selecting instructed output frequency and voltage independently of each other, containing a carrier frequency within a certain frequency range by having different number of samplings for each of plural output frequency groups, and for decoding said modulated sine wave to be applied to motor windings of an induction motor on a real time basis, said inverter comprising:

a microcomputer logic means having first means having a first microprocessor means for calculating and preparing a sampled, quantized and coded sine function for the next inverter application and a second microprocessor means for generating timing signals;

second means for storing sampled values of a plurality of differently sampled sine waves with unity magnitude and for storing the maximum and minimum voltage/frequency envelopes with respect to said induction motor;

third means for generating a base clock pulse for producing various timing signals;

fourth means having a first portion and a second portion which function alternately as a writing portion for storing a voltage weighted, sampled and quantized one-phase sine function and a reading portion for reading out the previously stored contents when it functioned as a writing portion to generate a three-phase sine wave;

fifth means having a first portion and a second portion which function alternately as writing portions for storing sampled, quantized and coded three-phase sine function and as reading portions for delivering the previously stored contents when they functioned as writing portions for decoding;

sixth means for discriminating the number of leading "0"s or "1"s of the pulse train representing a value of sampling from the coded binary sampled data transferred from said fifth means;

seventh means for decoding the pulse width modulated sine waves from said sixth means;

eighth means having a first preset counter and a second preset counter which alternately function as a waiting portion for.presetting the number of base clock pulses for the next cycle and as a working portion for counting down said base clock pulse supplied from said third means at a varying time rate determined by said preset value so as to generate a first level clock pulse for use with said sixth means;

ninth means having a first pointer for successively storing said sampled, quantized and coded sine function into said writing portion of said fourth means, a second pointer for editing and generating said three-phase sine waves from said one-phase sine wave, and a third pointer for incrementing the addresses of both said writing and reading portions of said fifth means and for generating a third level clock pulse for alternating said fifth means;

tenth means for counting down said first level clock pulse supplied from said eighth means to generate a second level clock pulse for said second and third address pointers in said ninth means;

eleventh means for counting down said clock pulse supplied from said tenth means to generate a clock pulse for said first address pointer;

twelfth means for obtaining a preset signal for said sixth means from the reset signal to said sixth means; and thirteenth means for inverting the polarities of the outputs from said seventh means to generate pulse width modulated six-phase sine waves; and fourteenth means for delaying the build-up time of the positive-going pulses of the decoded signal from said seventh means; and a power generator means having fifteenth means for transforming an alternating current line voltage power source into a direct current power source;

sixteenth means for amplifying the signal from said fourteenth means to supply enough current sources to the following seventeenth means; and seventeenth means having tandemly connected power transistors for amplifying the current level supplied from said fourteenth means; and eighteenth means for receiving the current source from said seventeenth means.

2. An inverter as claimed in claim 1, wherein said saisd first means comprises a dual microprocessor, said second means comprises a read-only memory, said third means comprises a crystal oscillator, said fourth means comprises a set random-access-memory, said fifth means comprises dual three phase random-access memories, said sixth means comprises three phase preset counters, said seventh means comprises three phase latches, said eighth means comprises a dual preset counter, said ninth means comprises three address pointers, said tenth means comprises an 8-bit counter for counting down said first level clock pulse 256 times, said eleventh means comprises a calculation counter, said twelfth means comprises a delay circuit, said thirteenth means comprises voltage inverters, said fourteenth means comprises low pass filters, said fifteenth means comprises an AC/DC converter, said sixteenth means comprises base driver, said seventeenth means comprises amplifiers, said eighteenth means comprises motor winding.

3. An inverter as claimed in claim 2, wherein said quantizing and coding of said sine wave for the inverter application is performed on a semi-real time basis using sampled values of said plurality of differently sampled sine waves with unity magnitude and without using any stored bit patterns representing actual voltage/frequency combinations.

4. An inverter as claimed in claim 2, wherein said pulse width modulated signal is qunatized in the form of an 8-bit binary digit representing 256 different quantizing levels and said quantized binary data is coded.

5. An inverter as claimed in claim 2, wherein said microprocessor is 8-bit type and made of complementary metal oxide semiconductor with masked ROM.

6. An inverter as claimed in claim 2, wherein said three-phase sine wave generation from said one-phase sine wave is performed using said set random-access-memories, said three-phase random-access-memories, and said second and third address pointers by shifting the data start point of the U-phase sine wave by 240 degrees and 120 degrees for the V-phase and W-phase sine wave, respectively, to generate said three-phase sine wave from said U-phase sine wave stored in said set random-access-memories and transferring said U-phase sine wave and said phase shifted sine waves to said three-phase randon-access-memories during three cycle times, selection of either one of said writing portions of said three-phase random-access-memories being made by giving an enabling signal to the chip enable terminal of the corresonding one of said three-phase random-access-memories.

7. An inverter as claimed in claim 2, wherein said pulse width modualted sine wave is decoded by said three-phase preset counters and said three-phase latches by presetting said preset counters with said coded information, and the number of leading "0"s or "1"s and the number of trailing "1"s or "0"s of the pulse train representing a value of sampling are determined from said coded information by using a status of the borrow bit of and a reset signal applied to said preset counters and said clock pulse applied to said latches.

8. An inverter as claimed in claim 2, wherein said writing and reading of said three-phase random-access-memories are performed simultaneously using said third address pointer, and said writing is performed every three times of said reading.

9. An inverter as claimed in claim 2, wherein said working portion of said dual preset counter issues said real time clock pulse for use with said three-phase preset counters and said three-phase latches, while said preset value is loaded to said waiting portion of said dual preset counters on a non-real time basis for use with the next cycle real time clock pulse generation.

10. An inverter as claimed in claim 2, wherein a timing origin for said U-, V- and W-phase sine waves is selected at a point of the zero degree phase angle for said U-phase sine wave to ensure synchronization between said three phases of sine waves.

* * * * *